(12) United States Patent
Avis (10) Patent No.: US 7,573,212 B2
(45) Date of Patent: Aug. 11, 2009

(54) AUTOMATIC POWER CONTROL MODULE FOR BATTERY POWERED DEVICES

(76) Inventor: Deborah K. Avis, 217 La Puerta Way, Palm Beach, FL (US) 33480

( * ) Notice: Subject to any disclaimer, the term of this patent is extended or adjusted under 35 U.S.C. 154(b) by 711 days.

(21) Appl. No.: 10/763,504

(22) Filed: Jan. 22, 2004

(65) Prior Publication Data

US 2005/0088120 A1     Apr. 28, 2005

Related U.S. Application Data

(60) Provisional application No. 60/442,317, filed on Jan. 22, 2003.

(51) Int. Cl.
*H05B 37/02*     (2006.01)
(52) U.S. Cl. .................. 315/360; 315/200 A; 315/362; 315/363
(58) Field of Classification Search ............... 315/360, 315/363, 159, 33, 136, 158, 200 A, 307, 175–176, 315/362; 340/815.4
See application file for complete search history.

(56) References Cited

U.S. PATENT DOCUMENTS

| | | | |
|---|---|---|---|
| 3,535,282 A | 10/1970 | Mallory | |
| 4,450,351 A | 5/1984 | Fraden | |
| 4,451,871 A | 5/1984 | Kirkley et al. | |
| 4,461,977 A | 7/1984 | Pierpoint et al. | |
| 4,581,500 A * | 4/1986 | Henderson et al. | 200/11 DA |
| 4,809,122 A * | 2/1989 | Fitzner | 361/18 |
| 4,825,143 A * | 4/1989 | Cheng | 323/351 |
| 4,851,738 A | 7/1989 | Yang | |
| 4,875,147 A | 10/1989 | Auer | |
| 4,921,211 A * | 5/1990 | Novak et al. | 251/129.04 |
| 4,978,946 A * | 12/1990 | Nordholm et al. | 340/573.1 |
| 5,029,214 A * | 7/1991 | Hollander | 704/272 |
| 5,138,538 A | 8/1992 | Sperling | |
| 5,173,655 A | 12/1992 | Conzelmann et al. | 323/285 |
| 5,235,321 A * | 8/1993 | Rowan et al. | 340/571 |
| 5,386,210 A * | 1/1995 | Lee | 340/567 |
| 5,394,063 A * | 2/1995 | Nakazawa | 315/159 |
| 5,432,500 A * | 7/1995 | Scripps | 340/628 |
| 5,486,914 A * | 1/1996 | Denove et al. | 356/221 |
| 5,497,066 A * | 3/1996 | Drouillard et al. | 320/117 |
| 5,497,067 A * | 3/1996 | Shaw | 320/155 |
| 5,628,242 A * | 5/1997 | Higley | 99/332 |
| 5,657,417 A * | 8/1997 | Di Troia | 388/829 |

(Continued)

FOREIGN PATENT DOCUMENTS

EP     0 538 051 A2     4/1993

(Continued)

*Primary Examiner*—Douglas W. Owens
*Assistant Examiner*—Tran Chuc
(74) *Attorney, Agent, or Firm*—Ostrolenk, Faber, Gerb & Soffen, LLP (57) ABSTRACT

A power control module which can be used to automatically open a power circuit for electrically operated devices, particularly battery operated devices, during predetermined periods of non-use. A timer is reset by a motion detector indicating continuing use. The timer controls a transistor switch which closes and opens the power circuit as required. The timing interval can be user-selected e.g., by programming a microprocessor controller. The transition time between conductive and non-conductive states of the transistor can also be controlled to prolong the life of incandescent bulbs or other sensitive load devices.

3 Claims, 8 Drawing Sheets

U.S. PATENT DOCUMENTS

| | | | | |
|---|---|---|---|---|
| 5,686,887 | A * | 11/1997 | Chen et al. | 340/539.19 |
| 5,787,917 | A * | 8/1998 | Park et al. | 137/38 |
| 6,175,196 | B1 * | 1/2001 | Ragner et al. | 315/200 A |
| 6,249,089 | B1 | 6/2001 | Bruwer | |
| 6,265,984 | B1 * | 7/2001 | Molinaroli | 340/815.4 |
| 6,316,880 | B1 * | 11/2001 | Broadhurst | 315/200 A |
| 6,580,665 | B1 * | 6/2003 | Kamiyama et al. | 368/66 |
| 6,626,728 | B2 * | 9/2003 | Holt | 446/219 |
| 6,642,667 | B2 * | 11/2003 | Avis | 315/200 A |
| 6,710,705 | B1 * | 3/2004 | Smith et al. | 340/384.2 |
| 6,819,071 | B2 * | 11/2004 | Graham et al. | 318/442 |
| 6,820,018 | B2 * | 11/2004 | Akitaya et al. | 702/60 |
| 6,826,365 | B1 * | 11/2004 | Constable | 396/206 |
| 6,850,159 | B1 * | 2/2005 | Mudge | 340/541 |
| 6,856,242 | B2 * | 2/2005 | Trent | 340/384.1 |
| 6,952,084 | B2 * | 10/2005 | Bruwer | 315/200 A |
| 7,010,332 | B1 * | 3/2006 | Irvin et al. | 455/575.2 |
| 7,125,140 | B2 * | 10/2006 | Koch et al. | 362/205 |
| 2003/0057889 | A1 | 3/2003 | Avis | 315/291 |
| 2003/0127996 | A1 | 7/2003 | Bruwer | 315/291 |
| 2005/0104853 | A1 * | 5/2005 | Sitalasai et al. | 345/163 |

FOREIGN PATENT DOCUMENTS

EP     0 681 413 A2     11/1995

* cited by examiner

AUTOMATIC POWER CONTROL MODULE FOR BATTERY POWERED DEVICES

CROSS-REFERENCE TO RELATED APPLICATIONS

This application is based on and claims priority to U.S. Provisional Application Ser. No. 60/442,317, filed Jan. 22, 2003, the entire disclosure of which is incorporated by reference herein.

This application is also related to my U.S. Pat. No. 6,642,667, the entire disclosure of which is also incorporated by reference herein, and which includes reference to other patents that reflect the current state of the art.

BACKGROUND OF THE INVENTION

1. Technical Field of the Invention

The present invention relates to a control module for battery operated devices, which functions to open the battery circuit after a predetermined period of non-use. A timer including a motion detector is provided to re-close the battery circuit and reset the timer. The device is self-contained and is configurable so that it can easily be accommodated in many existing products without the need for redesign, or with only minimal redesign. The invention can have utility in flashlights, toys, and numerous other battery-operated devices for which power is needed only when the device is actually in use.

2. Relevant Art

A known problem with battery-powered devices, such as flashlights, toys, etc. is that they are often inadvertently left on after use, resulting in the cost and inconvenience of premature replacement of batteries. To avoid this, some battery-powered devices, include timers as part of the circuitry which shut the devices down, or initiate a standby mode after a predetermined period of non-use. Several such devices are mentioned in my above-referenced patent. There do not, however, appear to be commercially available shut-off devices adaptable to a wide range of products which can simply be purchased off the shelf, and interfaced with an existing product or design. Availability of such devices could reduce design time and cost, and through standardization, reduce component and even assembly cost. A properly designed device of this kind could be incorporated in many existing devices even by the end user, or during manufacture with no redesign in many instances, or with only minimum packaging and/or component layout redesign. A need for such a device clearly exists.

Another known problem, particularly in devices such as flashlights, is the need for frequent replacement of bulbs. Incandescent lamps for flashlights are rarely designed for long-life, and indeed, the opposite is usually true. Light output is generally increased at the expense of bulb life. Seemingly, spare bulbs are never at hand when needed, and replacement is often inconvenient in any event. A practical way to increase bulb life without reducing light output which could readily be incorporated in a flashlight would be desirable, but that, too, does not appear to be commercially available.

SUMMARY OF THE INVENTION

It is accordingly an object of the present invention to satisfy the above-described needs for a self-contained unit which provides an inactivity shut-off function and optionally, bulb-life enhancement, and which can be inserted in existing products with little or no redesign.

An additional object of the invention is to provide a control module which can be used with a variety of existing electrical and electronic devices to enhance utility through availability of programmable functions.

A further object of the invention is to provide a self-contained power control module for battery operated devices which can be programed for use in a variety of applications with different operating parameters.

A power control module device according to one feature of the invention comprises an electronic circuit board including a timer, a timer reset circuit, a transistor switch and an associated control circuit, and a motion detector, like an accelerometer. These are all mounted on a circuit board which can fit into many existing devices. The transistor is operable to open the battery circuit, thereby turning off a connected load after a predetermined period of non-use such as two minutes, if the device remains motionless.

The battery circuit is reactivated if motion of the device triggers the motion detector to reset the timer which then remains on for another two minute interval. The timer can also be reset by turning a main switch off and back on again. If the device is in constant motion, the motion detector is repeatedly reset for successive two minute intervals and the device remains in operation.

According to a second feature of the invention, the module is in the form of a thin disc or plate. Different sizes can be provided for use with different type batteries and battery compartment configurations. The module can then be installed in the battery compartment, in line with, or adjacent to the batteries, with the transistor switch in series with the battery circuit.

According to a further feature of the invention, the switch control circuit can include a delay timer which provides for controlled turn on and turn off of the transistor switch to enhance the life of a load device such as an incandescent lamp in a flashlight.

According to yet a further feature of the invention, an integrated circuit programmable controller can be included to provide selectable inactivity time out intervals, and selective operation of the turn on-turn off delay, and other user-programmable functions.

According to another feature of the invention, the module can be used with remotely located motion sensors and also to control mains-powered loads to provide programmable capabilities in devices lacking such features when purchased.

Other features and advantages of the present invention will become apparent from the following description of the invention which refers to the accompanying drawings.

DETAILED DESCRIPTION OF PREFERRED EMBODIMENTS

Figures 1A, 1B:
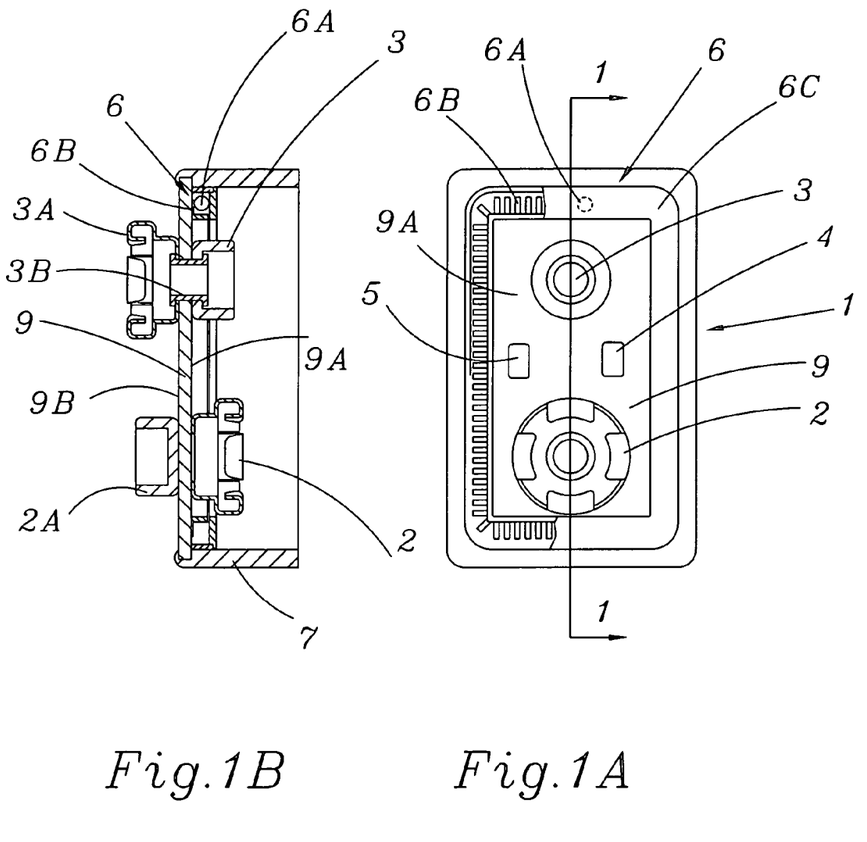
FIG. 1A is a plan view of a control module according to one embodiment of the invention designed for use with a standard nine volt battery showing a preferred mechanical arrangement of contacts and circuit elements.
FIG. 1B is a partially cross sectioned schematic view taken along line 1-1 in FIG. 1A.

FIGS. 1A and 1B show schematically a first embodiment of an automatic shut-off control module, generally denoted at 1. This is configured for use with a standard nine volt battery. Shut-off device 1 includes a base plate 9 which is preferably a printed circuit board (PCB) fabricated in conventional fashion. On one side 9A of PCB 9 are mounted a transistor switch 4, a control unit 5 including a timer, a timer reset circuit, and a driver for transistor 4, a motion sensor 6, a female snap connector 2 and a male snap connector 3. Connectors 2 and 3 are configured for respective attachment to the male (positive) and female (negative) terminals of a nine volt battery (not shown).

Mounted on the other side 9B of PCB 9 are snap terminals 2A and 3A, respectively aligned with terminals 2 and 3. Terminal 2A is male to correspond to the male positive terminal of the battery, and terminal 3A is female to correspond to the female negative terminal of the battery. Terminals 3 and 3A are electrically connected by a conductive sleeve 3B to provide a direct connection through the circuit board to the negative terminal of the battery. Terminals 2A and 3A are intended for connection in conventional fashion to provide operating power for a load device through a main on-off switch (both of which are not shown in the interest of simplicity).

As described in more detail below in connection with FIG. 6, transistor 4 provides a switched connection between positive terminals 2 and 2A, which are accordingly connected to the emitter and collector terminals if a junction transistor is employed, or to the source and drain terminals when a MOSFET or the like is employed.

Thus, when the main switch is turned on, transistor 4 is switched to its conductive state, and the battery circuit through contacts 2 and 2A is closed, permitting the load device to operate. As long as the timer in control circuit 5 is repeatedly reset by motion sensor 6 within its timing interval, transistor 4 remains conductive, and the battery circuit remains energized. However, if the timer times out, transistor 4 is switched to its non-conductive state and the battery circuit is opened. Transistor 4 remains non-conducting, and the battery circuit remains open, until motion is again detected, or the main switch for the load device is turned off, then on again.

Alternatively, positive terminals 2 and 2A can be connected-through on the circuit board with the transistor providing a switchable path between negative terminals 3 and 3A, depending on the type of transistor used and the design of the electronic circuit.

An outer skirt 7 formed of any suitable resilient material, may be insert molded onto circuit board 9 to give it orientation for connection to the battery terminals and help hold it in place along with its snap connectors 2 and 3.

Control circuit 5 can be fabricated as an integrated circuit on a custom circuit silicon die (a small chip of silicon with custom circuitry such as a computer chip) for high volume, low cost production. The chip is preferably surface mounted as shown on PCB 9 and then encapsulated with epoxy or the like onto board 9 for moisture and mechanical protection. Depending on the heat dissipation requirements, transistor 4 may be part of chip 5, or may be separately mounted and encapsulated, as shown.

Motion detector 6 for the control module 1 in FIG. 1 is comprised of a small metal ball 6A movably enclosed under an arcuate metal conductive cover 6C and is positioned and configured to make interrupted contact with an arcuate circuit trace 6B on PCB 9 as movement of device 1 causes motion of the ball. This intermittent contact closure continuously resets the timer in control circuit 5 as described below in connection with FIG. 6.

Figures 2A, 2B:
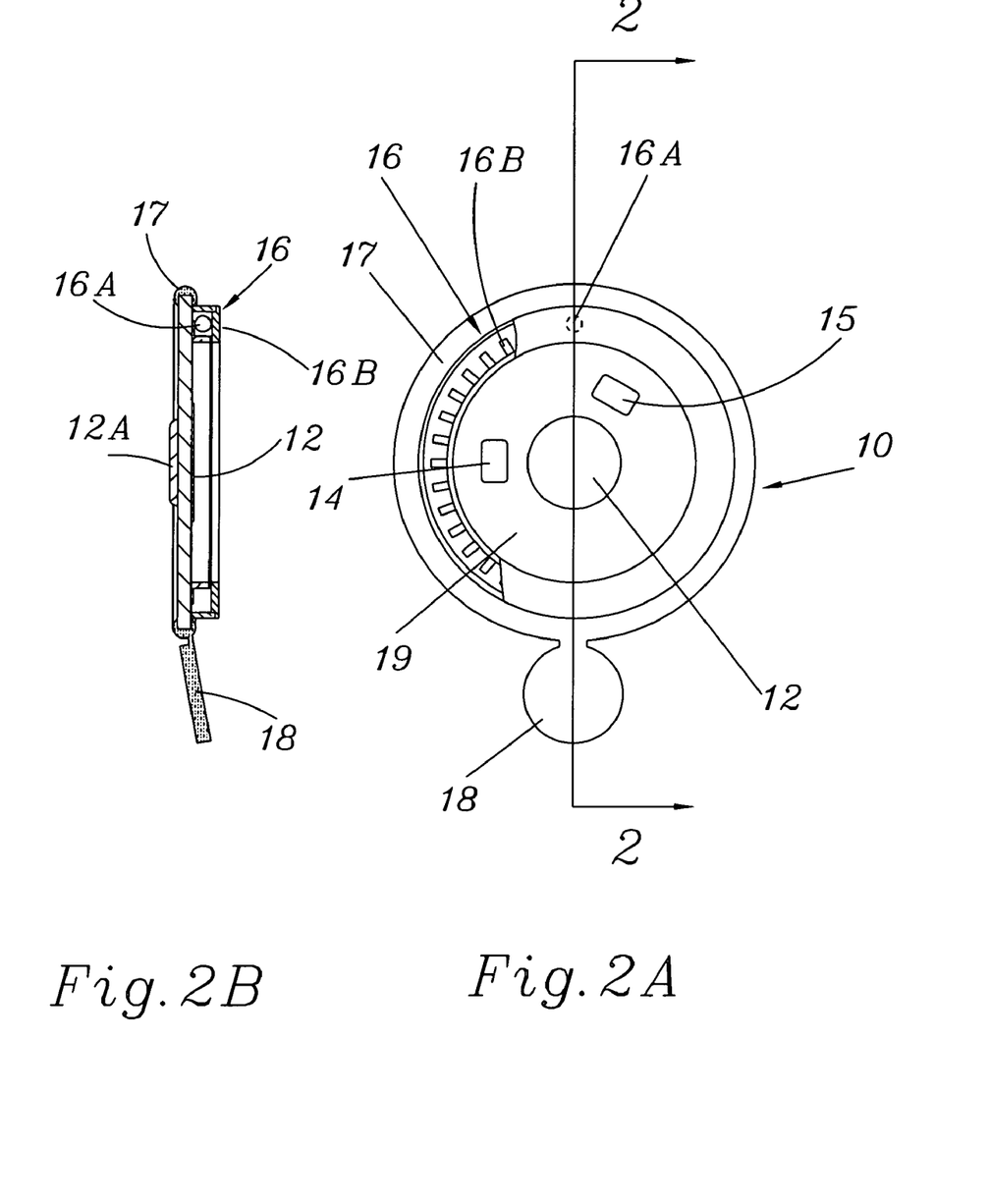
FIG. 2A is a plan view of a control module according to a second embodiment of the invention designed for insertion between batteries in a battery box in series with the battery electrical circuit showing a preferred mechanical arrangement of contacts and circuit elements.
FIG. 2B is a partially cross sectioned schematic view taken along line 2-2 in FIG. 2A.
Figure 3:
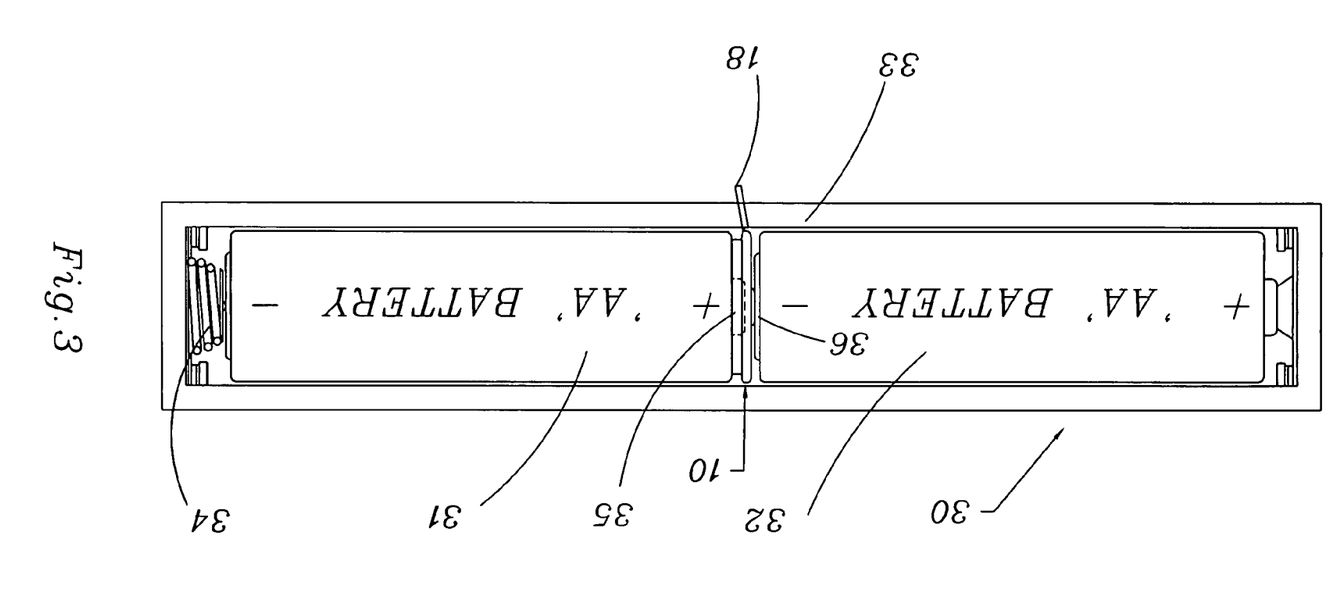
FIG. 3 is a schematic side elevation drawing of the control module of FIG. 2 inserted between batteries in a battery compartment.

FIGS. 2A and 2B illustrate a second embodiment of the automatic time-out shut-off device, generally denoted at 10. This is configured to be placed between two series-connected batteries 31 and 32 mounted in a battery compartment 30 such as the barrel of a flashlight or the like, as shown in FIG. 3. For simplicity, the load device and the main on-off switch are not illustrated.

Control module 10 includes a switching transistor 14, a control circuit 15, and a motion sensor 16, all of which may be respectively the same as or similar to transistor 4, control circuit 5, and motion sensor 6 previously described in connection with the embodiment of FIGS. 1A and 1B. All of these components are mounted on a PCB 19 with the transistor and control circuit encapsulated, also as described above.

As will be appreciated, PCB 19 is sized and configured to fit into battery compartment 30 with the overall thickness of device 10 being accommodated by compression of spring 34 at one end of battery compartment 30.

The outside edge of PCB 19 can be encapsulated with a resilient strip 17 made of rubber or the like, with a flexible tab 18 for aiding in removing the batteries from the battery compartment 30 as shown in FIG. 3.

When device 10 is installed, terminals 12 and 12A are respectively in contact with terminals 35 and 36 of batteries 31 and 32. Terminals 12 and 12A are insulated from each other by circuit board 19, and thus provide a break in the battery circuit for the load. Closure of the battery circuit is effected by connection of terminals 12 and 12A in series with the current path of transistor 14, e.g., with the collector and emitter terminals in the case of a junction transistor, or with the source and drain terminals of a MOSFET or the like, as in the embodiment of FIGS. 1A and 1B.

Also as in the embodiment of FIGS. 1A and 1B, when the main switch for the load device is turned on, transistor 14 is switched to its conductive state, and the battery circuit is completed. As long as the timer in control circuit 15 is repeatedly reset by motion sensor 16 within its timing interval, transistor 14 remains conductive, and the battery circuit remains energized. However, if the timer times out, transistor 14 is switched to its non-conductive state and the battery circuit is opened. Transistor 14 remains non-conducting, and the battery circuit remains open, until motion is again detected, or the main switch for the load device is turned off, then on again.

Figure 4A:
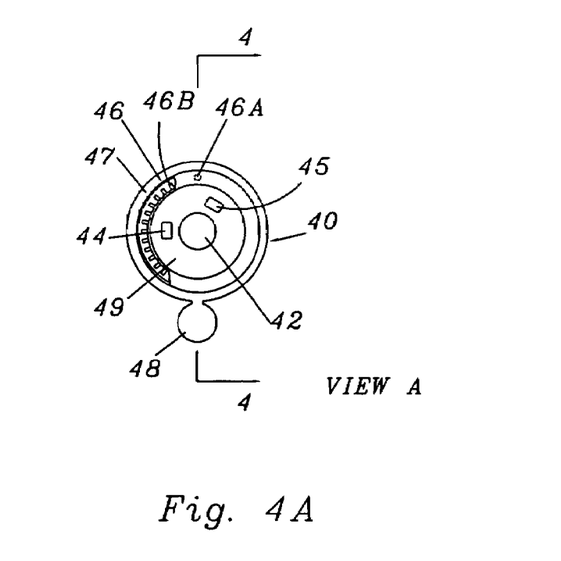
FIG. 4A is a bottom plan view of a control module according to a third embodiment of the invention similar to that shown in FIG. 2 but with a terminal clip to provide for attachment to a battery and provide both polarities (+) and (−) of the battery voltage to be available to operate the time-out circuit with a minimum of voltage drop to the system's series battery circuit.
Figure 4B:
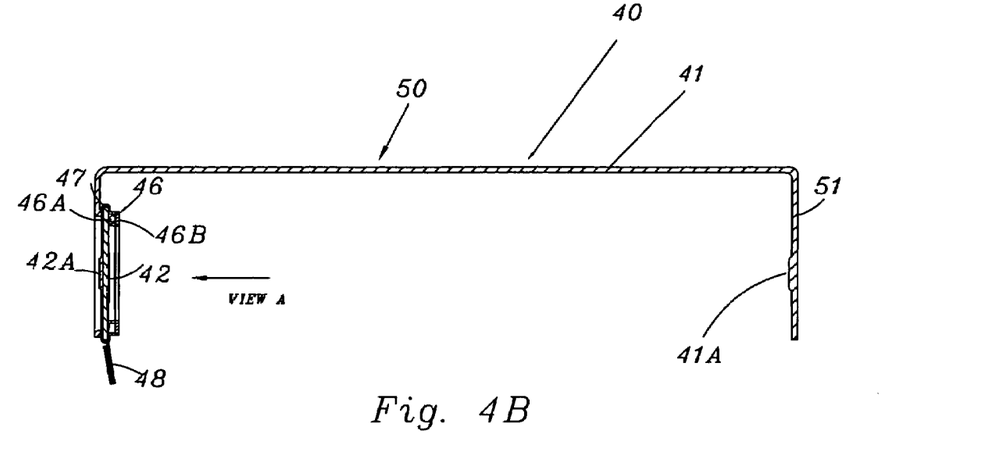
FIG. 4B is a partially cross sectioned schematic view taken along line 4-4 in FIG. 4A.
Figure 5A:
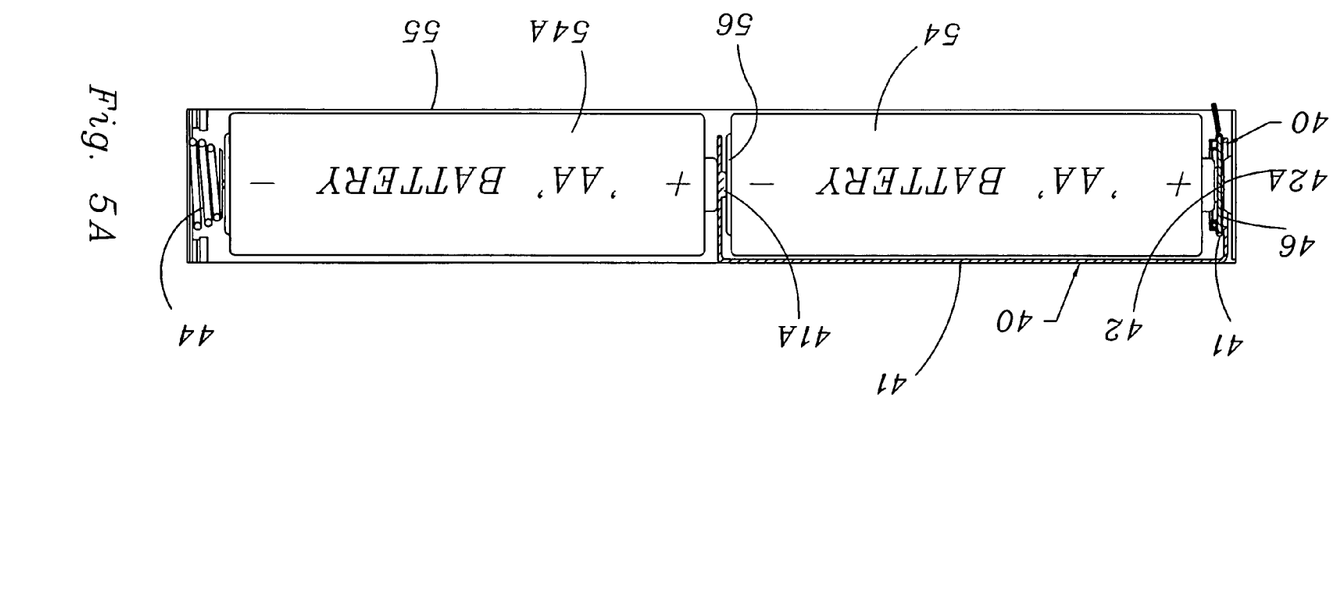
FIG. 5A is a schematic type drawing of the control module of FIG. 4 with the battery attachment and voltage supply clip insert into a typical battery compartment.
Figure 5B:
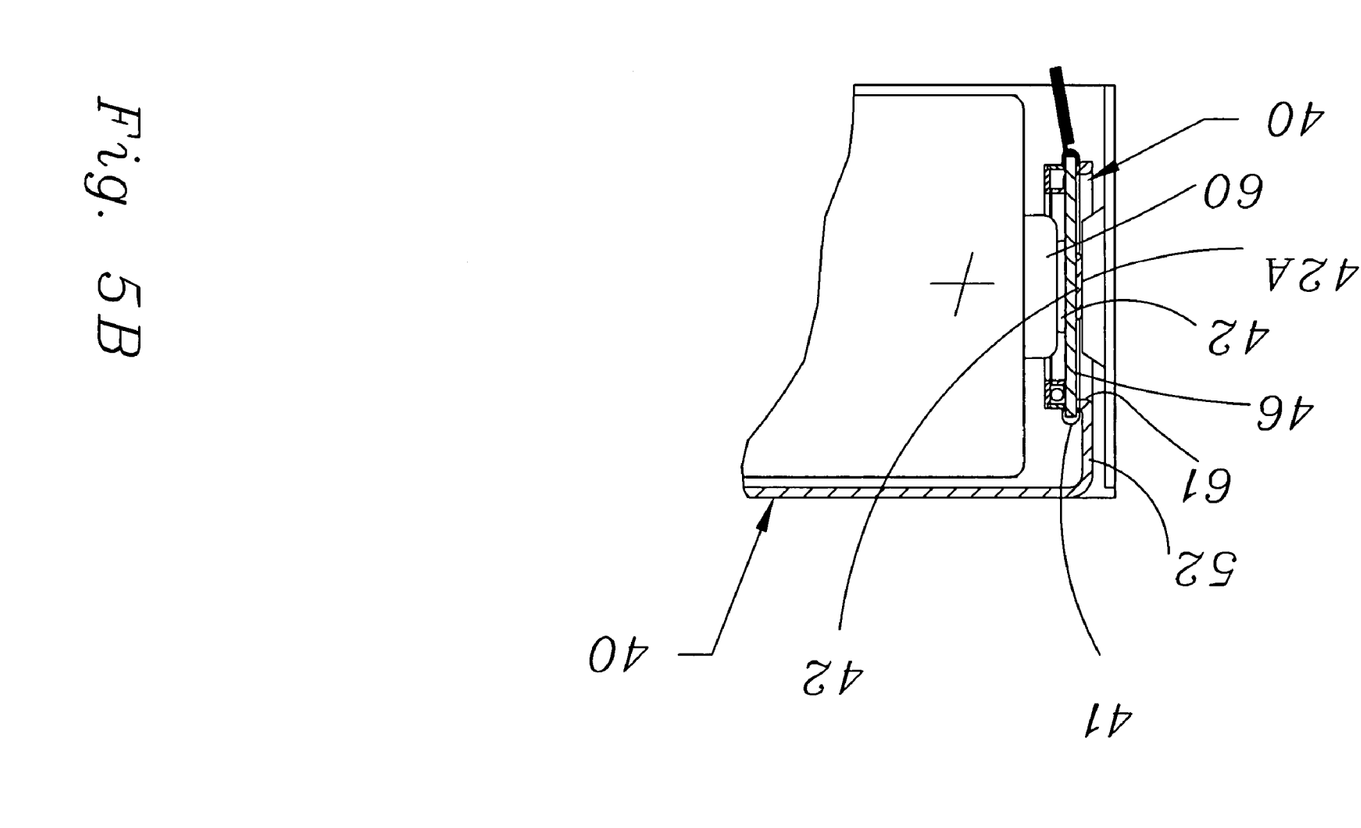
FIG. 5B is an enlarged view of a portion of FIG. 5A.

FIGS. 4A and 4B illustrate a power control module, generally denoted at 40, which is similar to device 10 of FIGS. 2A and 2B, but also includes a spring clip connector 50 preferably formed of an electrically conductive material, and having first and second circular end plates 51 and 52, and a connecting arm 41. Control module 40 is attached to end plate 52 in any suitable manner, as discussed more fully below. Spring clip connector 50 is configured to snap onto a cylindrical battery 54 installed with one or more additional batteries 54A in a battery compartment 55, as illustrated in FIG. 5. When spring clip 50 is attached to battery 54, a contact area 41A on end plate 51 is connected to the negative battery pole 56, and a contact 42 on module 40 is connected to positive battery pole 60.

Control module 40 includes a switching transistor 44, a control chip 45 including a timer and timer reset circuit, and a motion detector 46, all mounted as previously described on a PCB 49. A second terminal 42A on the side of PCB 49 opposite to terminal 42 permits connection of the batteries and the control module in the battery circuit for the load device (not shown). For this purpose, end plate 52 includes a circular central aperture 61 through which terminal 42A is accessible. As will be appreciated, module 40 is secured to the margin of aperture 62. This may be done by a suitable adhesive, or in the process of encapsulating transistor 44 and control chip 45.

Transistor 44 and control chip 45 function in the same way as transistor 24 and control chip 25 in the embodiment of FIGS. 2A and 2B to connect terminals 42 and 42A when the battery circuit is intended to be energized, and to break the connection between terminals 42 and 42A when the battery circuit is intended to be de-energized.

With the construction of FIGS. 4A and 4B, electrical connections to both poles 58 and 60 of battery 54 are available at module 40. This permits operation of the control device with a minimum series circuit voltage drop.

Figure 6:
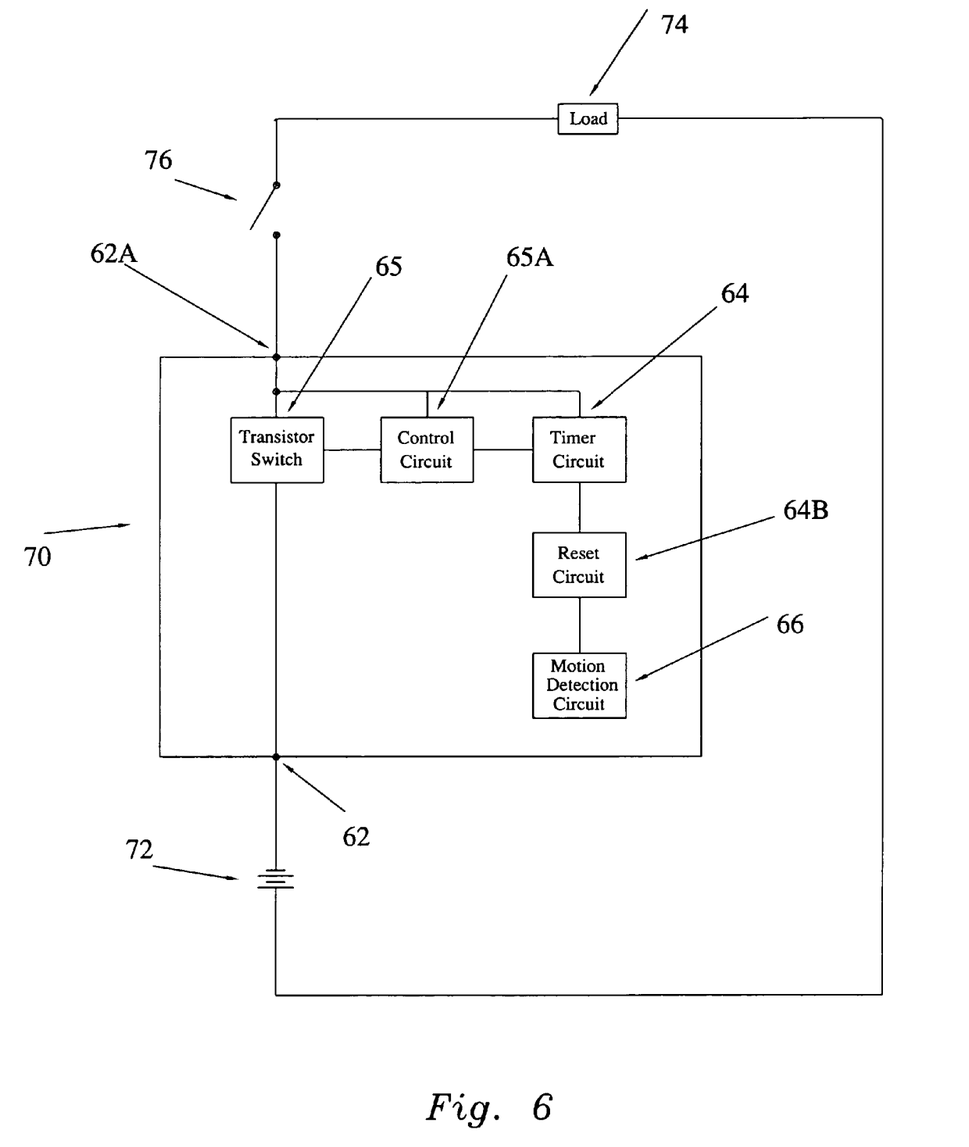
FIG. 6 is a block diagram of the circuitry of an automatic time-out shut-off device with movement sensing reset according to the invention.
Figure 7:
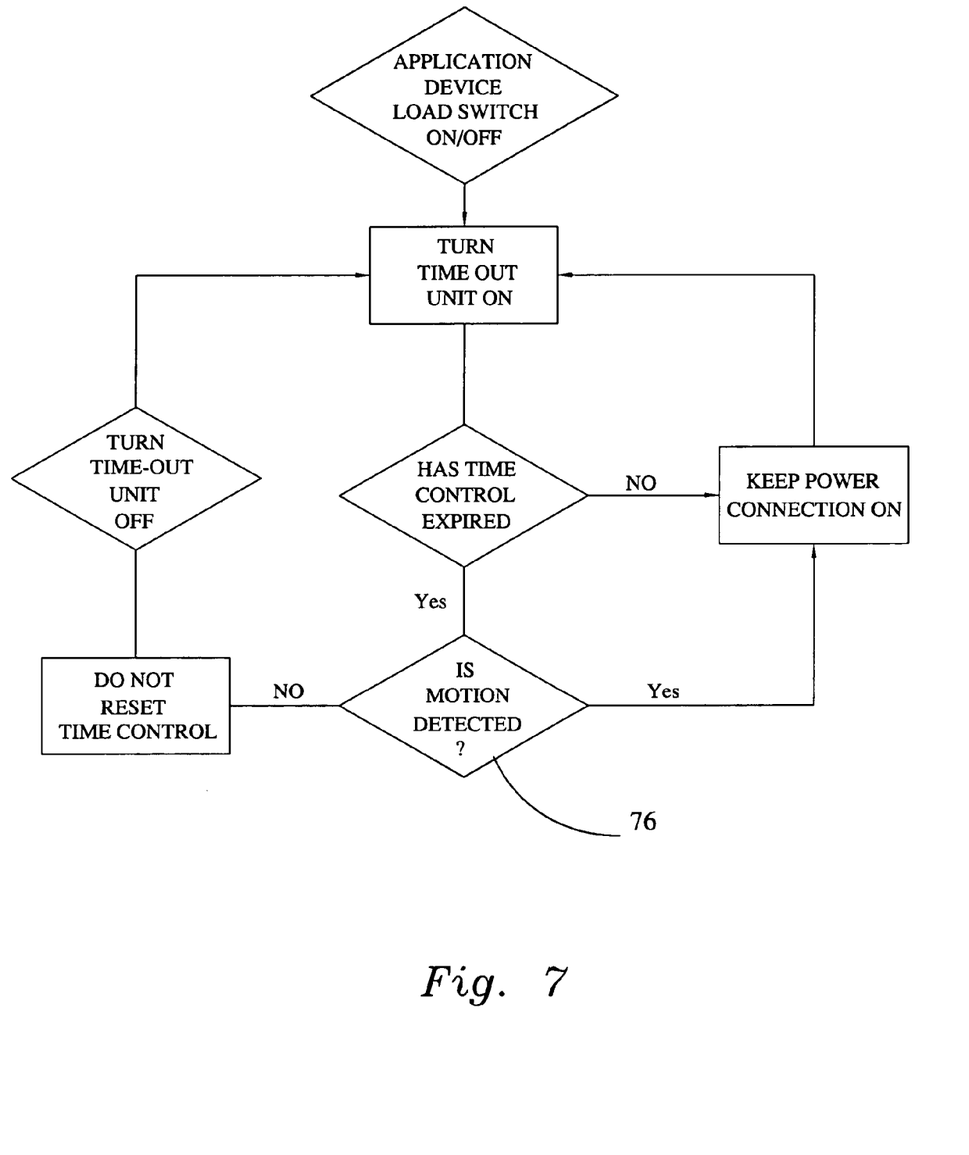
FIG. 7 is a flow chart showing the operational characteristics of the automatic time-out shut-off device with movement sensing reset.

FIG. 6 shows a basic block diagram schematic of the electrical control circuitry of the automatic time-out device with its flow-charted operational characteristics shown in FIG. 7.

In FIG. 6, a generalized module 70 is shown connected between battery input terminals 62 and 62A in a series circuit comprised of a battery 72, a load 74 and a main on-off switch 76. Connection between terminals 62 and 62A is through the current path of a transistor switch 65.

Control module 70 is also comprised of a control circuit 65A which drives transistor 65 into and out of conduction as required, a timer circuit 64 and a timer reset circuit 64A, and a motion detector 66. Control circuit 65A and timer 64 respond to an off-on transition of switch 76 to start the timing interval and to place transistor 65 in the fully conductive state. This completes the battery circuit through terminals 62 and 62A, and energizes load 74. Timer reset circuit 64A, and motion detector 66 cooperate to reset timer 64 whenever motion is detected.

If the timing interval ends without motion being detected, timer circuit operates control circuit 65A to place transistor 65 in its non-conductive state. This opens the battery circuit and energizes load 74. A long as switch 76 remains closed, motion sensed by detector 66 will reset timer 64 and transistor 65 will again be placed in its conductive state to re-energize the battery circuit. A similar result is obtained if main switch 76 is opened and re-closed.

No exact electrical circuit implementation for module 70 is disclosed, as many circuits capable of performing the functions described will be readily apparent to those skilled in the art.

In this connection, it should be recognized that the required functions may readily be provided by a programmed microprocessor implementation. That has the advantage of facilitating programmed setting of a desired time out interval, and also selectable provision of controlled turn on and turn off of transistor 65.

It should also be recognized that the life of certain devices such an incandescent bulbs or sensitive electronic devices can be significantly increased if they are not subjected to the shock of large current changes when they are energized and de-energized. This can be achieved according to the present invention by incorporating into transistor control circuit 65A a delay feature providing a staged transition, e.g., over a one or two second interval, between the conductive and non-conductive states of transistor 65. Various ways of doing this, both in a circuit implementation of control circuit 65, or as part of a microprocessor implementation, will be readily apparent to those skilled in the art.

The resulting soft turn on and turn off current to the incandescent filament, etc., can greatly enhance the life of such a device. Additionally, either or both the automatic turn off and the controlled transition functions can be made selectable, especially by preprogramming in a microprocessor implementation, while use of switches or the like to provide this function (or time-out interval selection) might prohibitively increase the size of the module.

The programmable microprocessor implementation with a suitable interface such as a PC or dedicated input device can also allow use of the control module for programming customized on/off control of a variety of existing battery operated devices, or even mains-operated devices. For the latter purpose, module could be incorporated in a unit having a plug for direct connection to the wiring, and a receptacle for providing power to the controlled device. Thus, on/off control desired for particular time of day, for example, for home lighting, heating or an oven could be provided. Additionally with suitable motion detectors (including, if desired, remote detectors), the device can readily be used as an intrusion detector for homes to provide an alarm and turn on lights as desired. Other applications will also be readily apparent to those skilled in the art.

The motion detector can be a number of different types known in the art such as accelerometers, mechanical vibration sensors vibrating wires, etc., as well as various non-contact sensors for detecting motion in volumes of space such as rooms. For example, a drop of mercury could replace the ball to make and break contact with the traces on the circuit board.

Therefore, while the present invention has been described a relation to particular embodiments thereof, many other variations and modifications and other uses will become apparent to those skilled in the art. It is therefore intended that the present invention not be limited by the specific disclosures herein but that it be afforded the full scope defined by the appended claims.

What is claimed is:

1. A small thin disc configured and sized for insertion in a battery cavity between a load device and the battery having an automatic shut off timing device whose action is inhibited by a motion detector, the automatic shut off timing device further comprising:

an electronic switch operable between a conductive and a non-conductive state to selectively connect the battery to the load device;
a timer operable to initiate a timing interval in response to motion sensed by the motion detector; and
a control circuit responsive to signals from the timer to operate the electronic switch to connect the battery to the load device only during the timing interval.

2. A device as in claim 1, wherein the control circuit is operative to gradually vary the conductive state of the electronic switch between a fully conductive state and a fully non-conductive state so that current flow from the battery to the load device does not change abruptly when the load device is turned on and off.

3. A device as in claim 1, including the motion detector operative to reset the timer so that the battery powered device continues to operate as long as there is some motion during the timing period before shut-off; wherein the timer is operative when reset to provide a first output signal during the predetermined timing interval and a second output signal after conclusion of the timing interval; and the control unit is responsive to the first output signal to drive the electronic switch into the conductive state, and responsive to the second output signal to drive the electronic switch into the non-conductive state;

whereby the battery is connected to the load device through the first and second terminals only during the timing interval.

\* \* \* \* \*

UNITED STATES PATENT AND TRADEMARK OFFICE
CERTIFICATE OF CORRECTION

PATENT NO.       : 7,573,212 B2                                    Page 1 of 1
APPLICATION NO.  : 10/763504
DATED            : August 11, 2009
INVENTOR(S)      : Deborah K. Avis It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 908 days.

Signed and Sealed this

Fourteenth Day of December, 2010

David J. Kappos
*Director of the United States Patent and Trademark Office*